United States Patent Office 3,531,422
Patented Sept. 29, 1970

3,531,422
POLYMERIC COMPOUNDS CONTAINING
NITROGEN AND PHOSPHORUS
Michael Green, Chew Stoke, Somerset, Robert Neville Haszeldine, Disley, and Gordon Stanley Anderson Hopkins, Poynton, England, assignors to National Research Development Corporation, London, England, a British corporation
No Drawing. Filed Dec. 27, 1966, Ser. No. 604,548
Claims priority, application Great Britain, Dec. 29, 1965, 55,147/65, 55,148/65
Int. Cl. C08g 33/16
U.S. Cl. 260—2                     11 Claims

ABSTRACT OF THE DISCLOSURE

Polymers having the repeating structural unit

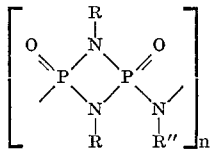

wherein R, R', and R" are alkyl radicals having from 1–10 carbon atoms, substituted alkyl radicals, aryl radicals, or substituted aryl radicals, and $n$ is an integer greater than 1. A process for the manufacture of these polymers from N,N' - disubstituted-dihalodiazadiphosphetidine-2,4-dioxides of the structural formula:

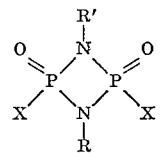

wherein R and R' are as previously defined, and X represents a chlorine, bromine or iodine atom, by reaction with an amine R'"N(R")R"", wherein R" is as previously defined, and R'" and R"" are hydrogen atoms or alkyl substituted silyl radicals. The polymers have good thermal and solvent resistance and are suitable for use as heat resistant coatings, sealants, gaskets, and the like.

---

This invention relates to polymeric organic compounds which contain nitrogen and phosphorus in the polymer chain.

The invention provides, as a new class of compounds, polymers having a linear chain of repeated

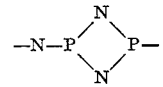

units and having the general formula

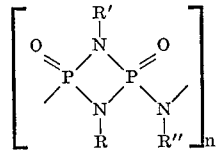

In the above general formula R and R' represent alkyl groups containing 1–10 carbon atoms, substituted alkyl, aryl or substituted aryl groups. R" similarly represents alkyl, substituted alkyl, aryl or substituted aryl groups and $n$ represents an integer greater than 1.

Polymeric compounds containing repeating

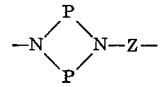

units where $Z=(CH_2)_n$, diphenyloxy and other organic groups containing only carbon chains linking nitrogen of one ring to nitrogen of another, have been reported (L. Parts, et al., Inorganic Chemistry, 1964, 3, 1261). These were prepared from acyclic precursors by condensation and transamidation reactions, whereas the present invention provides the first direct route to the novel polymeric compounds containing repeating units

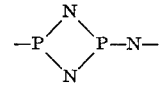

described above. It will be noted that the phosphorus of one ring is joined to phosphorus in a second ring only by nitrogen and not by carbon. The polymerization is achieved by the reaction of N,N'-dialkyl- or N,N'-diaryl-2,4-dihalodiazadiphosphetidine-2,4-dioxides of formula I where X represents a chlorine, bromine, or iodine atom, with an amine of general formula R"N(R'")R"" where R" is as defined above, and R'" and R"" are hydrogen atoms or preferably, alkyl substituted silyl groups.

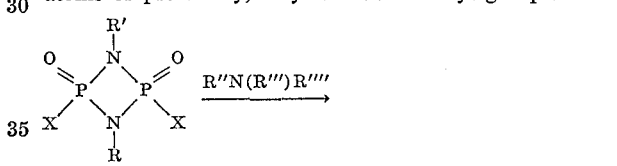

The preferred amine is a hexa-alkyl disilazane, i.e. where R'" and R"" are trialkyl-substituted silyl groups, since the trialkylchlorosilane by-product is volatile and may be conveniently removed from the reaction product by distillation. The alkyl substituents of the silyl groups preferably contain up to six carbon atoms.

In particular, compounds of type (I) in which R=R'=methyl, ethyl, propyl or phenyl may be polymerised with, for example, N-phenyl hexamethyldisilazane and N-methyl hexamethyldisilazane.

The reaction is rapid and conveniently carried out either in the absence of any solvent or with a solvent. When a solvent is used it is often advantageous to add a concentrated solution of each reactant simultaneously to the hot solvent. The solvent is not critical as long as it does not react with the compound (I) or the disilazane, and a nonpolar organic solvent such as symmetrical tetrachloroethane or an aromatic hydrocarbon is satisfactory. Alternatively, a polar solvent such as sulpholane or diglyme may be used. The reaction may be carried out in glass equipment or in metal under autogaseous pressure. The reaction is often advantageously carried out with a molar ratio of reactants of 1:1, or alternatively with a slight excess (1–2%) of the hexa-alkyldisilazane. In general, reaction temperatures in the range 0° to 200° C., are found to be suitable for the process of this invention, but the preferred temperature is the reflux temperature of the reaction mixture at atmospheric pressure, since volatile by-products may then conveniently be removed from the reaction product by allowing them to distill off either during or after the polymerisation reaction. The liquid residue is allowed to cool, then poured into a suitable organic solvent such as diethyl ether to precipitate the polymer.

The polymers of this invention show outstanding thermal resistance. In particular, the polymer from (I), in which R and R' are phenyl and the amine used was N-phenyl hexamethyldisilazane, was heated in air and lost less than 10% of its total weight at up to 300° C. Similarly, the polymer from (I), in which R and R' are methyl and the amine was N-methyl hexamethyldisilazane, was heated in air and lost less than 10% of its total weight at up to 325° C. Polymers of the general type claimed are therefore suitable for use as heat resistant polymers, resins and coatings and may also be bonded with suitable inorganic matrices.

Improved heat-resistance may be obtained by suitable post polymerisation treatment. For example such treatment may consist of heating the polymers at 250–350° C. for a period of 15 minutes to 2 hours, after which the polymers show no significant (less than 0.5%) loss of total weight at up to 600° C.

The polymers also show resistance to a wide variety of organic and inorganic liquids.

For example the polymer from (I), in which R=R'=phenyl and N-phenyl hexamethyldisilazane is used is unaffected by non-polar solvents such as benzene and carbon tetrachloride and by polar solvents such as water, acetonitrile or nitrobenzene. Polymers of the general type claimed are therefore suitable for use as sealants, gaskets, etc., in chemical reactors or mechanical equipment in contact with organic and inorganic liquids.

Various examples of the formation of polymers containing cyclic repeating units by use of the disilazane reaction will now be described.

EXAMPLE 1

N-methylhexamethyldisilazane (9.0 g., 0.051 mole) in dry sym-tetrachloroethane (44.2 g.) was added to a flask containing 1,3 - dimethyl - 2,4 - dichlorodiazadiphosphetidine-2,4-dioxide (11.0 g. 0.049 mole) in dry sym-tetrachloroethane (100 g.), and the reaction mixture was heated at reflux for 1 hr. Trimethylchlorosilant (9.5 g., 0.88 mole, 89%) was then removed by fractionation through a Vigreux column. The remaining solution was allowed to cool and then poured into dry ether (1 litre) then a white flocculent precipitate was formed. This precipitate was filtered, washed with dry ether, and dried at room temperature, in vacuo, to yield a white solid polymer (8.6 g., 96% of theoretical yield).

Found (percent): C, 17.7; H, 5.2; N, 23.3; P, 33.0. $(C_3H_9N_3O_2P_2)_n$ requires (percent): C, 19.7; H, 4.9; N, 23.0; P, 35.0.

EXAMPLE 2

N-phenylhexamethyldisilazane (3.34 g., 0.014 mole) in dry sym-tetrachloroethane (15 mls.) and 1,3-diphenyl-2,4 - dichlorodiazadiphosphetidine - 2,4 - dioxide (4.8 g., 0.014 moles) in sym-tetrachloroethane (15 mls.) were added simultaneously and at the same rate to boiling sym-tetrachloroethane (20 mls.) in a Pyrex flask. Trimethylchlorosilane (2.4 g., 80%) was continuously removed from the reaction mixture during 1½ hours. After cooling, the solution was poured into light petroleum (1 litre). The precipitated product (4.3 g., 85%) was washed with light petroleum and dried in vacuo to yield a solid polymer.

EXAMPLE 3

N-phenylhexamethyldisilazane (11.6 g. 0.049 mole) in dry sulpholane (50 mls.) and 1,3 - diphenyl - 2,4 - dichlorodiazadiphosphetidine - 2,4 - dioxide (16.9 g. 0.049 moles) in 50 mls. dry sulpholane were added simultaneously at the same rate to refluxing dry sulpholane (75 mls.) in a Pyrex flask. Trimethylchlorosilane (7.0 g. 70%) was continuously removed from the reaction mixture during 1½ hours. After cooling, the solution was poured into diethyl ether (500 mls.). The precipitated product (13.5 g., 75%) was washed with diethyl ether and dried in vacuo to yield a solid polymer.

Found (percent): C, 57.4; H, 4.8; N, 10.8.

$$(C_{18}H_{15}N_3O_2P_2)_n$$

requires (percent): C, 58.9; H, 4.1; N, 11.4.

EXAMPLE 4

N-phenylhexamethydisilazane (79 g., 0.033 m.) and 1,3 - diphenyl - 2,4 - dichlorodiazadiphosphetidine - 2,4-dioxide (11.6 g., 0.033 m.) were dissolved in anhydrous diglyme (150 mls.) and sealed in vacuo in a Pyrex vessel. The mixture was heated at 150° C. for 1½ hours, the vessel opened, chlorotrimethylsilane (6.2 g., 86%) removed and the mixture poured into anhydrous ether to give, after filtration and drying, solid polymer. (9.6 g., 78%).

In accordance with an important feature of the present invention, the substituted diazadiphosphetidine precursors of the polymeric organic compounds containing phosphorus and nitrogen hereinbefore described are provided by a facile process hereinafter described. This process provides, as new compounds, N,N″ - dialkyl- or N,N′-diaryl - 2,4 - dihalodiazadiphosphetidine - 2,4 - dioxides having the general formula:

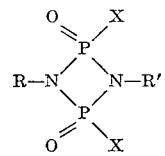

In the above general formula R and R' may be alkyl groups containing 1–10 carbon atoms, substituted alkyl, aryl or substituted aryl groups and X represents a chlorine, bromine or iodine atom, preferably chlorine.

It has been found that the reaction of an alkyl or aryl hexahalodiazadiphosphetidine, of type

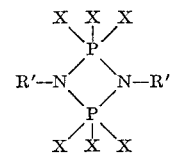

(where R and R' are as defined above and X is a chlorine, bromine or iodine atom) with dry sulphur dioxide, in a suitable solvent, proceeds as follows, for example in the case where X=Cl:

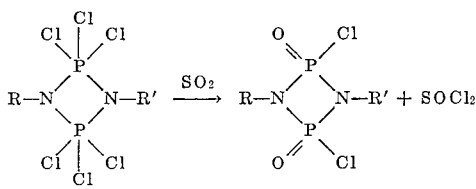

The use of dry sulphur dioxide as a reagent and as a diluent or solvent is an important and possibly essential part of the process, and it is particularly noteworthy that Zhumurova and Kirsanov have shown that reaction of an aryl hexachlorodiazadiphosphetidine with moist sulphur dioxide yields only acyclic products and not the desired cyclic products (Zhumurova and Kinsanov, Zh, Ob, Kh., 1960, 30, 4048). These authors also reported that aryl hexachlorodiazadiphosphetidines did not react with sulphur dioxide. (Zh, Ob, Kh., 1960, 30, 3044).

N,N'-dialkyl- or N,N' - diaryl - 2,4 - dihalodiazadiphosphetidine dioxides, in addition to being particularly useful as chemical intermediates in the preparation of new polymers as hereinbefore described are also of value in the preparation of novel diazadiphosphetidine derivatives, which may for example be used as insectides, plasticisers, flame retardants for impregnating fabrics, and as semi-conductors.

In accordance with this feature of the invention, dry sulphur dioxide is reacted with an N,N'-dialkyl or -diaryl-2,2,2,4,4,4 - hexahalodiazadiphosphetidine in a suitable solvent, the preferred solvent being liquid sulphur dioxide. The reaction may be carried out by use of glass vessels, or autogenous pressure may be employed. It is desirable to agitate the hexahalodiazadiphosphetidine and sulphur dioxide intermittently during the reaction period. In general, reaction temperatures in the range $-100°$ to $100°$ C. are found to be suitable for the process of this invention. At the end of reaction the sulphur dioxide is allowed to evaporate, together with other volatile materials, to leave the desired product. This may be purified by washing with a suitable solvent such as carbon tetrachloride or light petroleum, or by other conventional methods. Particular examples of the preparation of novel N,N'-dialkyl- and N,N' - diaryl - dichlorodiazadiphosphetidine - 2,4 - dioxides will now be described.

EXAMPLE A

Dry sulphur dioxide (106 g., 1.66 moles) was condensed into a cooled Pyrex Carius tube containing powdered 1,3-dimethyl - 2,2,2,4,4,4 - hexachlorodiazadiphosphetidine (31.6 g., 0.093 moles). The tube was sealed and allowed to warm slowly to room temperature with intermittent agitation. After 4 to 5 hours it was observed that all the dimethylhexachlorodiazadiphosphetidine had dissolved. After a further 12 hours the volatile materials were evaporated in vacuo, and shown by fractionation in vacuo and infrared spectroscopy to consist of sulphur dioxide and thionyl chloride (115 g., 97%). The solid reaction product (18.4 g., 90% recovery) was washed with dry carbon tetrachloride and then sublimed in vacuo at 60° C. to yield 1,3-dimethyl-2,4-dichlorodiazadiphosphetidine-2,4-dioxide, M.P. 100–102° C.

Found (percent): C, 10.7; H, 2.6, N, 12.5; Cl, 31.6; P. 28.0. $C_2H_6N_2P_2O_2Cl_2$ requires (percent): C, 10.8; H, 2.7; N, 12.6; Cl, 31.8; P, 27.8. Mass spectrum molecular ion $m/e=222$.

EXAMPLE B

Dry sulphur dioxide (24.45 g., 0.38 moles) was condensed in vacuo into a Pyrex Carius tube containing powdered 1,3-diethyl-2,2,2,4,4,4-hexachlorodiazadiphosphetidine (3.77 g., 0.011 mole). The tube was sealed, shaken and allowed to warm slowly to room temperature. After 10 minutes it was observed that the solid had dissolved. After a further 12 hours the volatile materials were evaporated in vacuo. The solid reaction product (2.6 g., 0.011 mole, 100% recovery) was washed with dry light petroleum and sublimed in vacuo at 40° C. to yield 1,3-diethyl-2,4-dichlorodiazadiphosphetidine-2,4-dioxide, M.P. 65–68° C.

Found (percent): C, 19.1; H, 4.1; N, 11.5; Cl, 28.6; P, 25.0. $C_4H_{10}N_2P_2O_2Cl_2$ requires (percent): C, 19.1; H, 4.0; N, 11.2; Cl, 28.3; P, 24.7.

EXAMPLE C

Dry sulphur dioxide (1.84 g., 1.3 moles) was condensed in vacuo into a Pyrex Carius tube conatining powdered 1,3-di-n-propyl-2,2,2,4,4,4-hexachlorodiazadiphosphetidine (12.7 g., 0.032 mole). The tube was sealed and allowed to warm slowly to room temperature with intermittent agitation. After 12 hours the volatile materials (72.2 g.) were evaporated in vacuo. The liquid residue was dissolved in dry light petroleum and the solution cooled to $-78°$ C. During the cooling process a solid crystallised out, and the supernatant liquid was decanted off. The solid melted on warming to room temperature. The resulting liquid was distilled under nitrogen to yield a pale yellow liquid, 1,3-di-n-propyl-2,4-dichlorodiazadiphosphetidine-2,4-dioxide, B.P. 110°/0.1 mm.

Found (percent): C, 25.6; H, 4.7; N, 10.3; P, 22.4; Cl, 25.2. $C_6H_{14}N_2P_2O_2Cl_2$ requires (percent): C, 25.8; H, 5.0; N, 10.6; P, 22.2; Cl, 25.6.

EXAMPLE D

Dry sulphur dioxide (30.0 g., 0.47 mole) was condensed in vacuo into a Pyrex Carius tube containing powdered 1,3-diphenyl-2,2,2,4,4,4-hexachlorodiazadiphosphetidine (10.1 g., 0.022 mole). The tube was sealed and allowed to warm slowly to room temperature with intermittent agitation. After 12 hours the volatile materials were evaporaed in vacuo. The solid reaction product (7.7 g., 100% recovery) was washed with dry light petroleum and sublimed at 100° C. to yield 1,3-diphenyl-2,4-dichlorodiazadiphosphetidine-2,4-dioxide, M.P. 136–138° C.

Found (percent): C, 41.5; H, 3.1; N, 8.2; P, 18.1; Cl, 20.2. $C_{12}H_{10}N_2P_2D_2Cl_2$ requires (percent): C, 41.5; H, 2.9; N, 8.1; P, 17.9; Cl, 20.5.

We claim:

1. The class of polymers consisting essentially of repeating units of the structural formula:

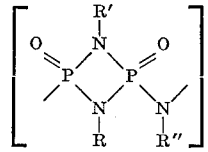

wherein R, R', and R" are selected from the group consisting of alkyl radicals having from 1–10 carbon atoms and aryl radicals.

2. The class of polymers according to claim 1, in which R and R' are methyl, and R" is methyl or phenyl.

3. The class of polymers according to claim 1, wherein R, R' and R" are each phenyl.

4. The class of polymers according to claim 2, wherein R, R', and R" are each methyl.

5. A process for the manufacture of the class of polymers claimed in claim 1, which comprises reacting an N,N'-disubstituted-dihalodiazadiphosphetidine-2, 4-dioxide having the structural formula:

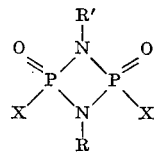

wherein R and R' are selected from the group consisting of alkyl radicals having from 1–10 carbon atoms and aryl radicals, and X represents a chlorine, bromine, or iodine atom, with an amine R'''N(R'')R'''', wherein R" is selected from the group consisting of alkyl radicals having from 1–10 carbon atoms and aryl radicals, and R''' and R'''' are selected from the group consisting of hydrogen atoms and alkyl substituted silyl radicals, to form the polymer:

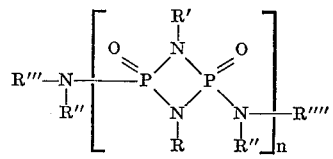

wherein $n$ is an integer greater than one

6. A process according to claim 5, wherein R''' and R'''' are trialkyl substituted silyl radicals.

7. A process according to claim 6, wherein the reaction is carried out in a solvent which is inert to the reactants.

8. A process according to claim 7, wherein the solvent is selected from the group consisting of diglyme, sulpholane, symmetrical tetrachloroethane, and aromatic hydrocarbons.

9. A process according to claim 8, wherein the reaction is carried out at the reflux temperature of the reaction mixture at atmospheric pressure.

10. A process according to claim 6, wherein the reaction is carried out at a temperature of 0–200° C.

11. A process according to claim 5, wherein the polymer is subjected to a post-polymerization treatment to improve its heat-resistance comprising heating the polymer at 250–350° C. for a period of from 15 minutes to 2 hours.

References Cited

UNITED STATES PATENTS 3,314,899  4/1967  Parts et al. _____ 260—2

SAMUEL H. BLECH, Primary Examiner

U.S. Cl. X.R.

117—136, 161; 252—62.3; 260—30.6, 448.2, 543; 424—200